United States Patent
Payyappilly

(10) Patent No.: US 10,391,437 B2
(45) Date of Patent: Aug. 27, 2019

(54) FILTER MEDIA CONSTRUCTION

(71) Applicant: Filtrum Fibretechnologies Private Limited, Pune (IN)

(72) Inventor: Thomas Antony Payyappilly, Pune (IN)

(73) Assignee: Filtrum Fibretechnologies Private Limited, Pune (IN)

( * ) Notice: Subject to any disclaimer, the term of this patent is extended or adjusted under 35 U.S.C. 154(b) by 349 days.

(21) Appl. No.: 15/127,219

(22) PCT Filed: Apr. 8, 2015

(86) PCT No.: PCT/IB2015/052538
§ 371 (c)(1),
(2) Date: Sep. 19, 2016

(87) PCT Pub. No.: WO2015/155700
PCT Pub. Date: Oct. 15, 2015

(65) Prior Publication Data
US 2017/0106323 A1  Apr. 20, 2017

(30) Foreign Application Priority Data
Apr. 8, 2014 (IN) .......................... 1301/MUM/2014

(51) Int. Cl.
*B01D 46/00* (2006.01)
*B01D 46/52* (2006.01)

(52) U.S. Cl.
CPC ....... *B01D 46/528* (2013.01); *B01D 46/0021* (2013.01); *B01D 46/523* (2013.01); *B01D 46/527* (2013.01); *B01D 2275/105* (2013.01)

(58) Field of Classification Search
CPC .. B01D 46/523; B01D 46/527; B01D 46/528; B01D 2201/34; B01D 2275/105
See application file for complete search history.

(56) References Cited

U.S. PATENT DOCUMENTS 3,020,977 A  *  2/1962  Huppke ............... B01D 46/525
156/192
4,773,990 A    9/1988  Hood, Jr.
5,084,178 A    1/1992  Miller et al.
(Continued)

FOREIGN PATENT DOCUMENTS

WO        8701301 A1    3/1987

*Primary Examiner* — Jason M Greene
(74) *Attorney, Agent, or Firm* — The Webb Law Firm

(57) ABSTRACT

A filter media construction wherein at least two layers of a substantially open spacer and at least two layers of a filter media/material are combined in an alternating sequence and coiled around a core to form at least two distinct, continuous or segmented, coil-shaped fluid flow channels that are contiguous but separated by the filter media in the radial direction and extend axially from an inlet side to an outlet side of the filter media construction preventing direct fluid flow between the clean and dirty sides of the filter media construction. The spacer maintains substantially uniform width of the flow channels in the flow direction providing substantially uniform fluid flow. One flow channel is closed to fluid flow at the inlet side forming the clean side and the other flow channel is closed to fluid flow at the outlet side forming the dirty side of the filter media construction.

20 Claims, 7 Drawing Sheets

(56) References Cited

U.S. PATENT DOCUMENTS

| | | | | |
|---|---|---|---|---|
| 5,405,422 | A * | 4/1995 | Ueda | B01D 46/527 |
| | | | | 422/174 |
| 7,323,105 | B1 | 1/2008 | Janikowski et al. | |
| 7,625,418 | B1 * | 12/2009 | Choi | B01D 46/523 |
| | | | | 55/521 |
| 8,088,190 | B2 | 1/2012 | Patel et al. | |
| 8,506,668 | B2 | 8/2013 | Swanson et al. | |
| 2004/0244345 | A1 * | 12/2004 | Endo | B01D 46/528 |
| | | | | 55/525 |
| 2006/0144026 | A1 * | 7/2006 | Kim | B01D 46/403 |
| | | | | 55/520 |
| 2008/0000826 | A1 * | 1/2008 | Harder | B01D 46/527 |
| | | | | 210/321.61 |
| 2009/0175768 | A1 * | 7/2009 | Vakkilainen | B01D 46/521 |
| | | | | 422/180 |
| 2011/0042295 | A1 | 2/2011 | Merritt | |

* cited by examiner

FILTER MEDIA CONSTRUCTION

CROSS-REFERENCE TO RELATED APPLICATIONS

This application is the United States national phase of International Application No. PCT/IB2015/052538 filed Apr. 8, 2015, and claims priority to Indian Patent Application No. 1301/MUM/2014 filed Apr. 8, 2014, the disclosures of which are hereby incorporated in their entirety by reference.

FIELD

The present disclosure relates to the field of mechanical engineering. Particularly, the present disclosure relates to the field of filtration.

BACKGROUND

Filter elements are used to remove particulate contaminants from fluids such as air, gases and various liquids required in the operation of engines and equipment or for other uses. Normally, filter elements are made by providing conventional filter media constructions with features required for sealing, fitment, servicing, handling, etc. depending on applications. Filter elements thus made are fitted into filter housings made usually of metal and/or plastic which, in turn, are incorporated into fluid filtration systems.

Three very important performance parameters of a filter element are the pressure drop, particle separation efficiency and contaminant holding capacity. Pressure drop of a filter element is the difference between pressure of fluid at its inlet and that at outlet. Particle separation efficiency is expressed as the percentage of number or weight of contaminant particles removed by the filter element from the incoming fluid. Pressure drop of the filter element increases with usage as more and more contaminant particles carried by the incoming fluid are captured by filter media leading to partial or total blockage of flow channels causing increased restriction to fluid flow. Contaminant holding capacity is the amount of contaminant removed by the filter element before pressure drop reaches the upper limit acceptable in the application. Contaminant holding capacity of the filter element correlates to its life in the field.

In air/gas filtration systems the fluid flow often generates significant level of noise leading to user discomfort. The noise is generated by the turbulence in air/gas flow.

Therefore, it is highly desirable to have air/gas filtration systems with lowest possible flow turbulence.

A good filter element is expected to have minimum pressure drop, maximum particle separation efficiency and maximum contaminant holding capacity. In the case of air/gas filtration it is highly desirable, if a filter element is also suitable for designing a filtration system having lowest possible turbulence thereby achieving low overall pressure drop and noise level. Filter media and the type of filter media construction used to make the filter element largely determine the performance of a filter element.

Filter elements with pleated filter media constructions assembled into cylindrical, conical, panel-type or other forms are well known in prior art for a very long time. In these filter media constructions cross sectional area of inlet flow channel decreases continuously in the flow direction and that of the outlet flow channel increases continuously in the flow direction. The change in cross sectional area creates turbulence in fluid flow leading to higher pressure drop and faster plugging of filter media. As a result, filter elements with pleated filter media constructions give less-than-expected contaminant holding capacity compared to what is expected from filter media performance.

More recently, filter elements with filter media constructions wherein more streamlined fluid flow is achieved by creating multitude of juxtaposed inlet and outlet flow channels, having straight, uniform and identical cross sections in the flow direction, created by pleated or fluted media have been disclosed in prior art. Filter elements with these filter media constructions have been found to offer better performance compared to earlier elements in prior art with pleated filter media constructions assembled into cylindrical, conical, panel-type or other forms. This type of filter elements are known as axial flow filter elements, direct flow filter elements, etc. in prior art.

U.S. Pat. Nos. 4,589,983, 6,946,012, 6,953,124, 7,276,098 and 8,007,572 discloses the use of filter media constructions made of pleated or fluted media. These filter media constructions require pleating or fluting of media to create the multitude of straight, uniform channels needed for achieving streamlined fluid flow.

Normally the filter element manufacturer procures filter media from filter media suppliers and pleats or flutes it using special equipment having rolls with scoring blades or grooves. Pleating or fluting processes have detrimental effects on filter media. It is well understood that pleating or fluting deteriorates original properties of filter media leading to less-than-expected performance especially in contaminant holding capacity. It is also known that the mechanical forces applied by the pleating or fluting equipment on media often damage filter media. High-performance filter media such as laminated, dual or multi-layer media, nano-fibre coated media, micro-glass media, etc. are especially vulnerable in this respect.

It is also known that, in air/gas filtration, even though pleating or fluting allows packaging of more media area in a filter element of given size, filter elements made of pleated or fluted filter media constructions do not give the expected contaminant holding capacity due to restrictions to fluid flow and turbulence caused by geometrical and other constraints in filter media construction and the element.

U.S. Pat. Nos. 3,962,097 and 4,271,025 disclose filter cartridges having layers of filter media coiled around a central support. While this type of filter cartridges may be suitable for liquid filtration having low flow rates, they are not viable for filtration of air or gas streams due to the high restriction to fluid flow and faster plugging of flow paths caused by narrow and/or irregular flow channels.

There is, therefore, a need to develop a filter media construction that overcomes the drawbacks associated with prior art.

Some of the objects of the present disclosure which at least one embodiment is adapted to provide, are described herein below:

It is an object of the present disclosure to provide a filter media construction that is formed without pleating or fluting of filter media.

It is another object of the present disclosure to provide a filter media construction that has uniform axial fluid flow channels for achieving streamlined fluid flow thereby enabling comparatively less pressure drop.

It is still another object of the present disclosure to provide a filter media construction that creates comparatively less turbulence thereby creating comparatively less noise.

It is still another object of the present disclosure to provide a filter media construction wherein flow turbulence is minimized and filter media area usage is maximized in order to achieve substantially lower restriction and higher contaminant holding capacity.

Other objects and advantages of the present disclosure will be more apparent from the following description which is not intended to limit the scope of the present disclosure.

SUMMARY

The present disclosure discloses a filter media construction wherein two layers or sets of a spacer and two layers of a filter media/material are combined in an alternating sequence and coiled around a core to form two distinct, continuous or segmented, coil-shaped fluid flow channels that are contiguous but separated by the filter media in the radial direction and extending axially from the inlet side to the outlet side of the filter media construction preventing direct fluid flow between the clean and dirty sides of the filter media construction. The spacer residing in the sandwiched gap between filter media layers allows substantially unhindered fluid flow into and out of the sandwiched gap and in the axial direction. The spacer possesses sufficient compressive strength and thereby maintains substantially uniform width of flow channels in the flow direction. One of the flow channels is closed to fluid flow at axial end at the inlet side and the other flow channel is closed to fluid flow at axial end at the outlet side of the filter media construction. Flow channel having axial end closed at the inlet side is the clean side and flow channel having axial end closed at outlet side is the dirty side of the filter media construction. Inner and outer ends of both of the flow channels are closed along the axial direction. The peripheral edges of the inlet side and outlet side of the filter media construction are capable of being provided with gaskets for the purpose of sealing and fitment required for converting the filter media construction into an axial flow filter element.

As it may be evident to those skilled in the art, apart from 2 layers each of filter media and spacer, even multiples such as 4, 8, etc. layers or sets each of filter media and spacer can be combined in an alternating sequence and coiled around a core to make filter media constructions similar to those disclosed in the present disclosure.

BRIEF DESCRIPTION OF THE ACCOMPANYING DRAWINGS

DETAILED DESCRIPTION

A filter media construction of the present disclosure will now be described with reference to the embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Figure 1:
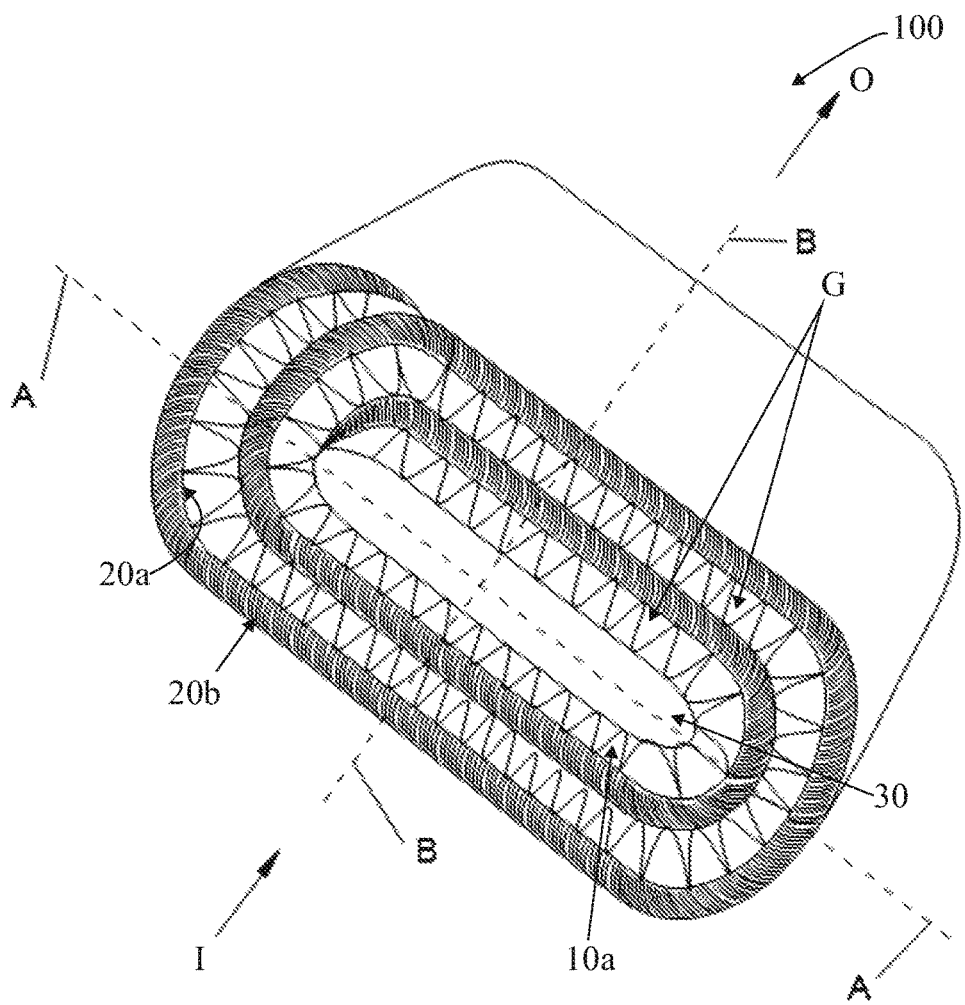
FIG. 1 illustrates a perspective view of a filter media construction, in accordance with one embodiment of the present disclosure.
Figure 2:
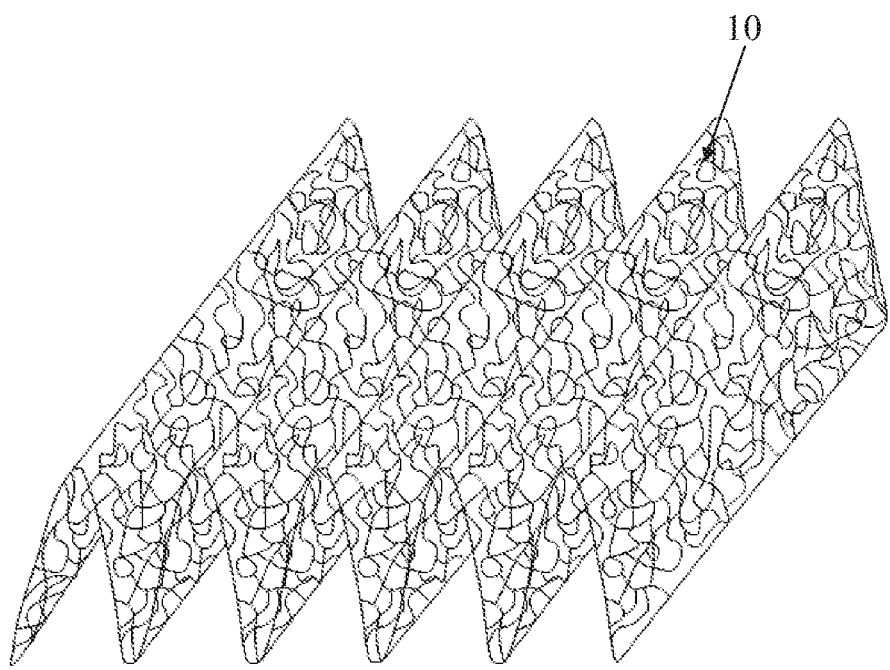
FIG. 2 illustrates a perspective view of a spacer of the filter media construction of FIG. 1.
Figure 3:
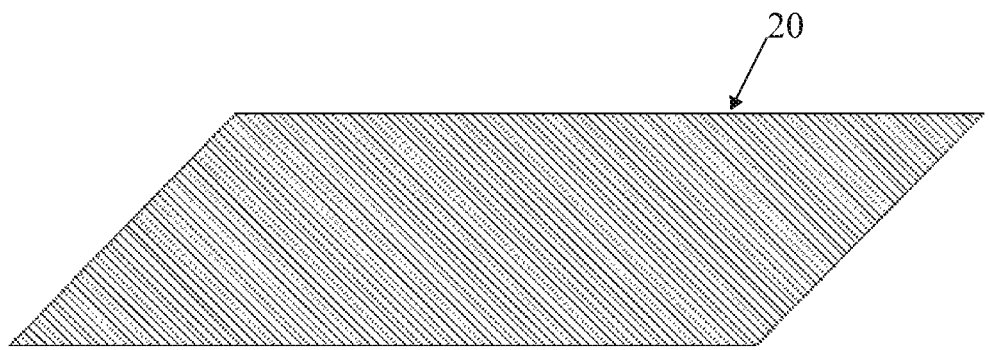
FIG. 3 illustrates a perspective view of a filter media of the filter media construction of FIG. 1.
Figure 4:
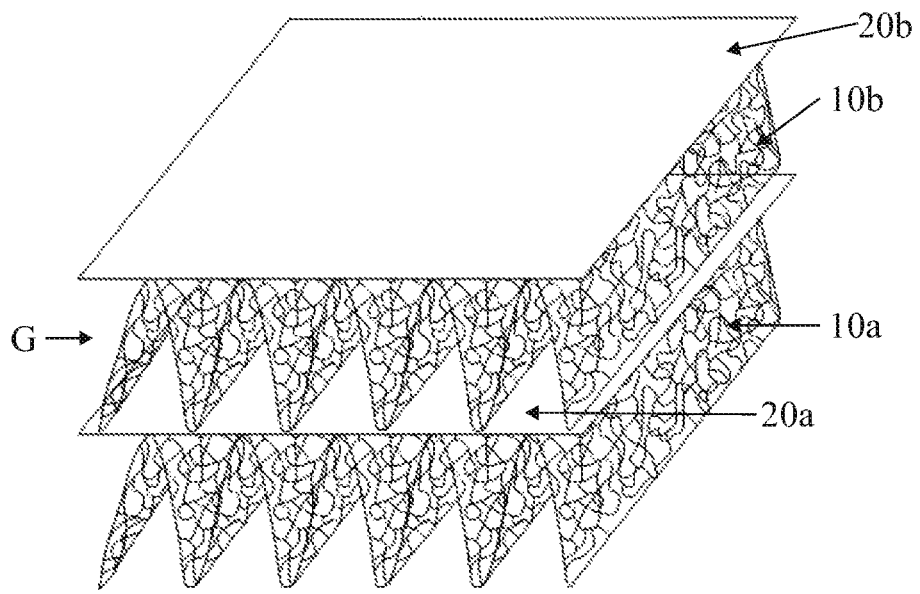
FIG. 4 illustrates a perspective view of two layers of the spacer of FIG. 2 and two layers of the filter media of FIG. 3 combined in an alternating sequence.
Figure 5:
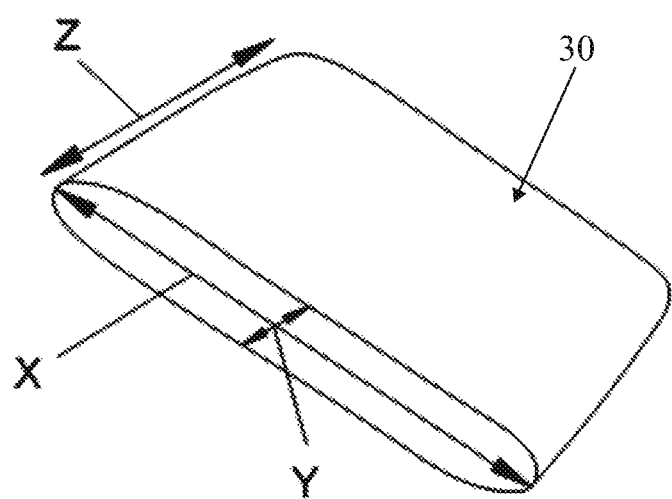
FIG. 5 illustrates a perspective view of the core of the filter media construction of FIG. 1.
Figure 6:
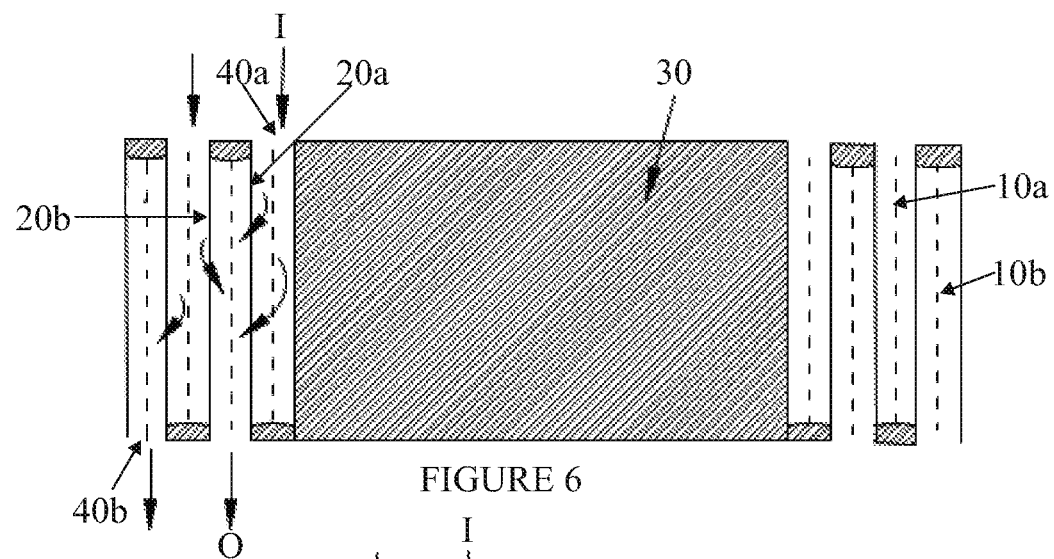
FIG. 6 illustrates a schematic representation of the flow paths of fluid within and outside the filter media construction with reference to the 'A-A' cross section of FIG. 1.
Figure 7:
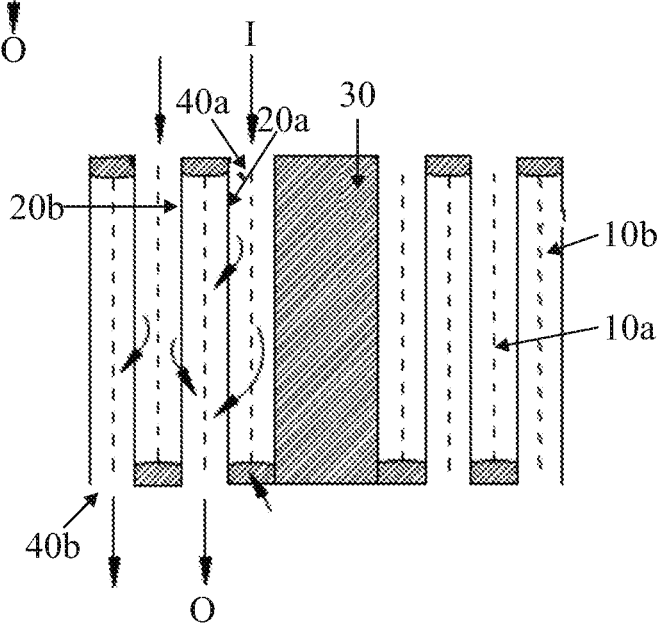
FIG. 7 illustrates another schematic representation of the flow paths of fluid within and outside the filter media construction with reference to the 'B-B' cross section of FIG. 1.

In accordance with the present disclosure as illustrated in FIG. 1, a filter media construction 100 that uses a substantially open spacer 10 and a filter media 20 and suitable for making axial flow filter elements is disclosed. The filter media construction 100 has two layers 10a and 10b of a spacer 10 (illustrated in FIG. 2) and two layers 20a and 20b of a filter media/material 20 (illustrated in FIG. 3) that are combined in an alternating sequence (as illustrated in FIG. 4) and coiled around a core 30 (illustrated in FIG. 5) to form two distinct, continuous, coil-shaped fluid flow channels 40a and 40b (illustrated in FIG. 6 and FIG. 7). The fluid flow channels 40a and 40b are contiguous but separated by the filter media 20 in the radial direction and extending axially from inlet side 'I' to outlet side 'O' of the filter media construction 100 thereby preventing direct fluid flow between the clean side (i.e. the outlet side 'O') and dirty side (i.e. the inlet side 'I') of the filter media construction 100.

Figure 8:
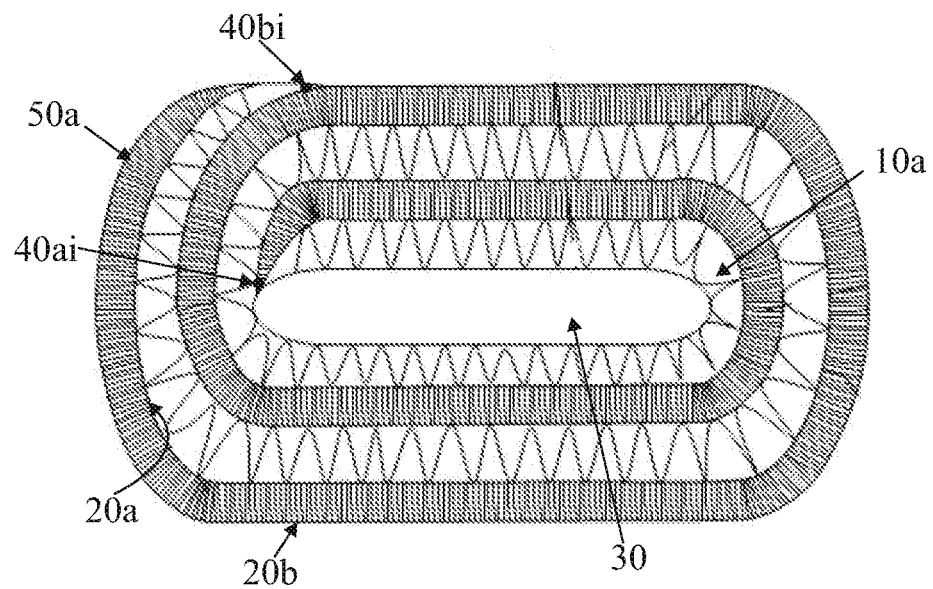
FIG. 8 illustrates the axial view of the inlet side of the filter media construction of FIG. 1.
Figure 9:
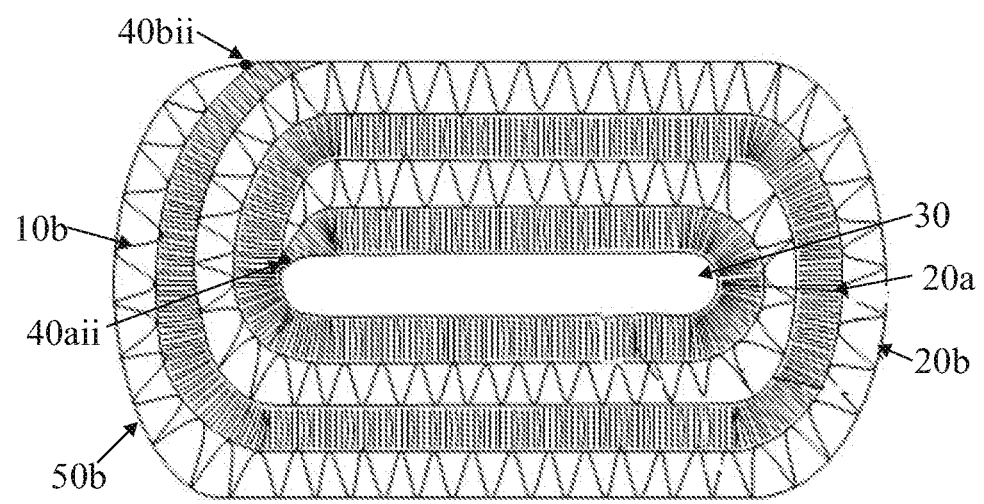
FIG. 9 illustrates the axial view of the outlet side of the filter media construction of FIG. 1.

The spacer 10 is disposed in the sandwiched gap 'G' formed between the two layers 20a and 20b of filter media and allowing fluid flow across the filter media 10 into and out of the sandwiched gap 'G' and in the axial direction. The spacer 10 has suitable thickness over the corrugations and sufficient compressive strength that maintains substantially uniform width for forming flow channels 40a and 40b in the flow direction. The flow channel 40b is closed to fluid flow at axial end at the inlet side 'I' of the filter media construction 100 which is the dirty side and the flow channel 40a is closed to fluid flow at axial end at the outlet side 'O' of the filter media construction 100 which is the clean side. Inner ends 40ai and 40aii and outer ends 40bi and 40bii (illustrated in FIG. 8 and FIG. 9) of the respective flow channels 40a and 40b are closed along the axial direction. The inner ends 40ai and 40aii and the outer ends 40bi and 40bii of the respective flow channels 40a and 40b are closed along the axial direction by suitable means or materials.

Typically, the spacer 10 is a corrugated random-fibre net made of plastic or metal or a corrugated mesh made of plastic or metal or a corrugated expanded metal or plastic or a perforated or corrugated metal or plastic or like elements which may be continuous or discontinuous in the axial or transverse directions or axial and transverse directions of the filter media construction. Alternatively the spacer 10 can be in the form of rods, balls, strips, threads, beads, rings, tubes, rollers, buttons or any other devices of geometrical or non-geometrical shapes which are connected or unconnected in axial and/or transverse directions, and solid or foamed or a combination of the two. The spacer can be continuous in the axial direction and discontinuous and connected/unconnected in the transverse direction. The spacer also can be discontinuous and unconnected in both the axial direction and the transverse direction of the filter media construction. When the spacer configuration is altered, this will require adaptations in the filter media construction itself which is a workshop modification well known to a person skilled in the art and is not elaborated herein after.

In one exemplary embodiment, spacer 10 is a corrugated, random-fibre net made of plastic having corrugations propagating in the transverse direction of the filter media construction. Each of the layers 10a and 10b of the spacer 10 is 3 mm thick over corrugation, 100 mm wide and approximately 5.7 m long.

In another exemplary embodiment, the spacer is constituted by plastic rods, 3 mm in diameter and approximately 100 mm long, laid in the axial direction with a distance of 25 mm between adjacent rods.

In still another exemplary embodiment, spacer 10 is constituted by plastic beads which have diameter of 3 mm. The spacer is discontinuous and unconnected in both the axial direction and the transverse direction of the filter media construction. The adjacently disposed plastic beads in transverse direction are placed at the distance of 25 mm and the adjacently disposed plastic beads in axial direction are placed at the distance of 20 mm In one more embodiment, spacer 10 is constituted by plastic beads which have diameter of 3 mm and connected by a plurality of strings running in the transverse direction of the filter media construction. The strings are thin enough to allow fluid flow in the axial direction.

Typically, the filter media 20 is a wet-laid cellulose media or a wet-laid or dry-laid synthetic media or a natural or synthetic woven media or a multi-material laminated media or a nanofibre-coated media or a microglass media or a synthetic open-cell foam or a membrane or like media.

In one exemplary embodiment, each of the layers 20a and 20b of the filter media 20 is 0.35 mm thick, 108 m wide and approximately 5.7 m long.

The core 30 can be made of plastic, wood, paper, metal or composite materials. The core 30 may be also formed by the filter media 20 or the spacer 10. The core 30 is either cylindrical or oval or racetrack-like shape or other like shapes. In one embodiment the core 30 has a racetrack-like shape having a longer cross-sectional dimension X of 210 mm, a shorter cross-sectional dimension Y of 18 mm and height Z of 110 mm In many of the aforementioned embodiments, the core can be configured with rectangular cut-outs for reducing weight.

In the aforementioned embodiments of the present disclosure, the process of pleating and fluting as required in conventional filter media construction are eliminated. The flow paths provide uniform fluid flow in the axial direction and hence provide comparatively less pressure drop. The uniform axial fluid flow provides comparatively less turbulence thereby creating comparatively less noise. Also, the filter media of the present disclosure maximizes usage of the filter media are thereby providing significantly higher contaminant holding capacity.

Although, all the embodiments of the present disclosure are described as having two layers or sets of the spacers and two layers of the filter media, the present disclosure is not limited to the use of two layers or sets of the spacers and two layers of the filter media. As may be evident to those skilled in the art, it is possible to make similar filter media constructions by combining 4, 8, 12, etc. layers or sets each of spacers and filter media in an alternating sequence and coiling around a core.

Test Performance:

An axial flow filter element was made with an embodiment of the filter media construction 100 by providing suitable gaskets at the peripheral edges 50a and 50b (illustrated in FIG. 8 and FIG. 9) required for sealing and fitment in an engine air intake system. The core had longer cross-sectional dimension of 341 mm, shorter cross-sectional dimension of 15 mm and height of 320 mm The core also had rectangular cut outs. The filter media were 0.35 mm thick, 320 mm wide and approximately 2265 mm long. The spacer was a corrugated, random-fibre net made of plastic and had thickness of 3 mm over corrugation, width of 310 mm and approximate length of 2255 mm The corrugations of the spacers propagated in the transverse direction of the filter media construction and the spacer was continuous in axial as well as transverse direction.

Figure 10:
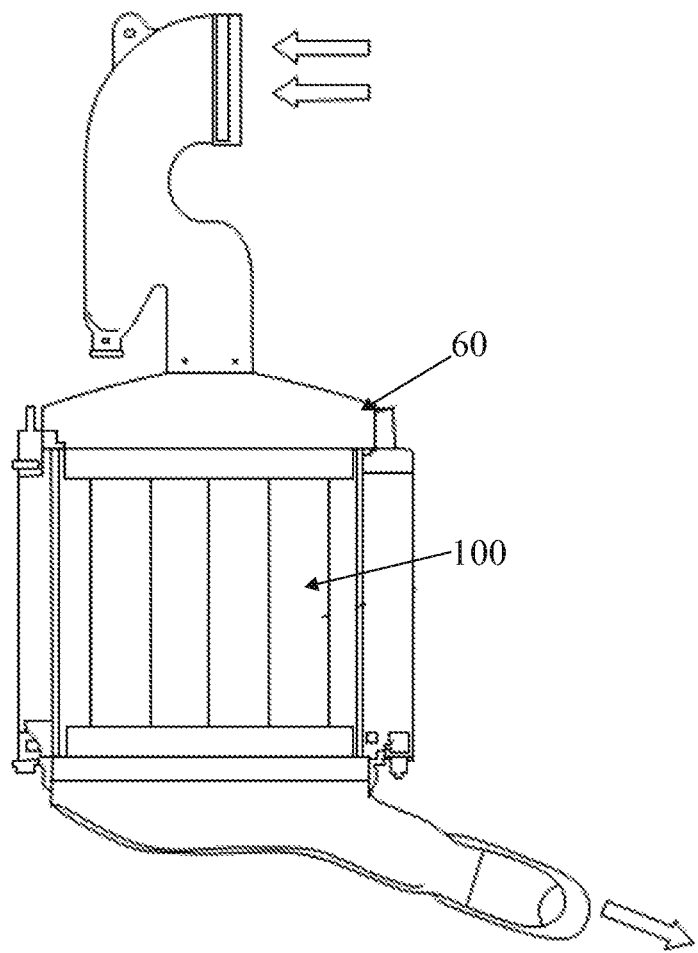
FIG. 10 illustrates the schematic view of an engine air intake system fitted with a filter element made of an embodiment of the filter media construction of FIG. 1.

The axial flow filter element thus made was fitted in the housing 60 (illustrated in FIG. 10) which, in turn, was fitted in the engine air intake system of a commercial vehicle. Comparative tests as per ISO 5011 were conducted on the air intake system fitted with the filter element made of filter media construction of the present disclosure and that with pleated filter media of prior art. The test results achieved are tabulated in Table 1.

TABLE 1

| | Test results | |
|---|---|---|
| | Air intake system | |
| Test parameter | With filter element made of pleated filter media construction as per prior art | With filter element made of filter media construction as per one embodiment of the present disclosure |
| Test standard | ISO 5011 | ISO 5011 |
| Test dust | ISO Fine | ISO Fine |
| Dust feed concentration, g/m$^3$ | 1.0 | 1.0 |
| Air flow rate, m$^3$/h | 118.93 | 118.93 |
| Initial restriction, mm of WC | 120.7 | 59.4 |
| Terminal restriction, mm of WC | 635 | 635 |

TABLE 1-continued

Test results

| | Air intake system | |
|---|---|---|
| Test parameter | With filter element made of pleated filter media construction as per prior art | With filter element made of filter media construction as per one embodiment of the present disclosure |
| Efficiency, % | 99.98 | 99.96 |
| Dust holding capacity, g | 720 | 1955 |
| Filter media area, m$^2$ | 2.20 | 1.45 |

In the working state it was found that the noise generated was significantly less than that generated by a filter element made of prior art filter media construction.

Technical Advantages

The filter media construction in accordance with the present disclosure has several technical advantages including but not limited to the realization of:

- a filter media construction that is formed without pleating or fluting processes;
- a filter construction that has uniform axial fluid flow passage for achieving streamlined fluid flow thereby enabling comparatively less pressure drop;
- a filter media construction wherein flow turbulence is minimized and filter media area usage is maximized in order to achieve substantially lower restriction and higher contaminant holding capacity; and
- a filter construction in which maximum area of a filter media is utilized for filtering fluid and hence provides significantly higher contaminant holding capacity.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form a part of the prior art base or were common general knowledge in the field relevant to the invention as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

While considerable emphasis has been placed herein on the specific features of the preferred embodiment, it will be appreciated that many additional features can be added and that many changes can be made in the preferred embodiment without departing from the principles of the invention. These and other changes in the preferred embodiment of the invention will be apparent to those skilled in the art from the disclosure herein, whereby it is to be distinctly understood that the foregoing descriptive matter is to be interpreted merely as illustrative of the invention and not as a limitation.

The invention claimed is:

1. An axial flow filter media construction using filter media comprising at least two layers of a substantially open corrugated spacer and at least two layers of a non-pleated and non-fluted filter media/material combined in an alternating sequence and coiled around a core to form at least two distinct, continuous, coil-shaped fluid flow channels that are contiguous but separated by said filter media in a radial direction and extend axially from an inlet side to an outlet side of the filter media construction preventing direct fluid flow between clean and dirty sides of the filter media construction, wherein corrugations of the spacer are adapted to propagate in a transverse direction of the filter media construction, the spacer is discontinuous in both of axial and transverse directions in a sandwiched gap formed between two layers of filter media and configured to allow fluid flow into and out of the sandwiched gap and within the sandwiched gap in both of the axial direction and the transverse direction, the spacer is adapted to form one or more substantially uninterrupted flow channels between the inlet side and the outlet side of the filter media construction in at least one of the axial direction and the transverse direction, and further to maintain substantially uniform width of the flow channels in a flow direction, one of the flow channels is closed to fluid flow at an axial end at the inlet side of the filter media construction thereby forming the clean side and another flow channel is closed to fluid flow at an axial end at the outlet side of the filter media construction thereby forming the dirty side, and inner and outer ends of both of said flow channels are closed along an axial direction.

2. The filter media construction as claimed in claim 1, wherein said spacer is selected from the group consisting of corrugated random-fibre net made of plastic or metal, corrugated mesh made of plastic or metal, corrugated expanded metal or plastic, and perforated and corrugated metal or plastic.

3. The filter media construction as claimed in claim 1, wherein said filter media is selected from the group consisting of wet-laid cellulose media, wet-laid or dry-laid synthetic media, natural or synthetic woven media, multi-material laminated media, nanofiber-coated media, microglass media, and synthetic open-cell foam or membrane.

4. The filter media construction as claimed in claim 1, wherein said core is made of a material selected from the group consisting of plastic, wood, paper, metal, and composite.

5. The filter media construction as claimed in claim 1, wherein said core is formed of said filter media or said spacer.

6. The filter media construction as claimed in claim 1, wherein said core is a shape selected from the group consisting of cylindrical, oval, and racetrack-like.

7. The filter media construction as claimed in claim 1, wherein said axial ends of said flow channels and said inner and outer ends of said flow channels are closed by means or materials selected from the group consisting of adhesive, ultrasonic welding, and tape.

8. The filter media construction as claimed in claim 1, wherein peripheral edges of said inlet side and said outlet side are capable of being provided with gaskets and features required for converting the said filter media construction into axial flow filter elements suitable for fitment in filter housing.

9. An axial flow filter media construction using filter media comprising at least two sets of at least one spacer and at least two layers of a filter media combined in an alternating sequence and coiled around a core to form at least two distinct, continuous or segmented, coil-shaped fluid flow channels which are contiguous but separated by said filter media in a radial direction and extend axially from an inlet side to an outlet side of the filter media construction preventing direct fluid flow between clean and dirty sides of the filter media construction, the at least one spacer being laid immovably as one of:
 a. a single, continuous piece in an axial direction wherein a length of the spacer is equal to or shorter than an axial length of the filter media; or
 b. two or more pieces in a column in the axial direction wherein the length of the spacer is substantially less than half of the axial length of the filter media;
 and with a distance between columns in a transverse direction in a sandwiched gap formed between two layers of said filter media,
 wherein, the at least one spacer is adapted to form one or more substantially uninterrupted flow channels between the inlet side and the outlet side of the filter media construction in at least one of the axial direction and the transverse direction, and further to maintain substantially uniform width of the flow channels in a flow direction,
 one of the flow channels is closed to fluid flow at an axial end at the inlet side of the filter media construction thereby forming the clean side and another flow channel is closed to fluid flow at an axial end at the outlet side of the filter media construction thereby forming the dirty side, and
 inner and outer ends of both flow channels are closed along the axial direction, and the spacer being discontinuous in both of axial and transverse directions in the sandwiched gap and configured to allow fluid flow into and out of the sandwiched gap and within the sandwiched gap in both of the axial direction and the transverse direction, and wherein each of the two layers of said filter media is a non-pleated and non-fluted filter media.

10. The filter media construction as claimed in claim 9, wherein said spacers are selected from the group consisting of plastic rods, strips, plastic tubes, threads made of natural or man-made fibres, wooden rods, solid hot-met rods, and foamed hot-met rods.

11. The filter media construction as claimed in claim 9, wherein said at least one spacer is connected by a plurality of strings running in the transverse direction of the filter media construction, the strings being thin enough to allow fluid flow in the axial direction.

12. An axial flow filter media construction using filter media comprising at least two sets of a plurality of spacers and at least two layers of a filter media combined in an alternating sequence and coiled around a core to form at least two distinct, continuous, coil-shaped fluid flow channels which are contiguous but separated by filter media in a radial direction and extend axially from an inlet side to an outlet side of the filter media construction preventing direct fluid flow between clean and dirty sides of the filter media construction, wherein the spacers are laid immovably in an array in a sandwiched gap between two layers of said filter media,
 the spacers are adapted to form one or more substantially uninterrupted flow channels between the inlet side and the outlet side of the filter media construction in at least one of the axial direction and the transverse direction, and further to maintain uniform width of the flow channels in a flow direction,
 one of the flow channels is closed to fluid flow at an axial end at the inlet side of the filter media construction thereby forming the clean side while another flow channel is closed to fluid flow at an axial end at the outlet side of the filter media construction thereby forming the dirty side, and
 inner and outer ends of both coil-shaped flow channels are closed along an axial direction, the spacers being discontinuous in both of axial and transverse directions in the sandwiched gap formed between the at least two layers of filter media and configured to allow fluid flow into and out of the sandwiched gap and within the sandwiched gap in both of the axial direction and the transverse direction, and wherein each of the two layers of said filter media is a non-pleated and non-fluted filter media.

13. The filter media construction as claimed in claim 12, wherein said spacers are selected from the group consisting of plastic balls, beads, plastic or inorganic buttons, solid or foamed hot-melt balls, organic beads, and buttons.

14. The filter media construction as claimed in claim 12, wherein said spacers are disposed in at least one of each row in the transverse direction and each column in the axial direction of the filter media construction and are connected by strings, the strings being thin enough to allow fluid flow in the axial direction.

15. An axial flow filter media construction using filter media comprising at least two sets of a plurality of substantially non-permeable corrugated spacers and at least two layers of a filter media combined in an alternating sequence and coiled around a core to form at least two distinct, continuous, coil-shaped fluid flow channels which are contiguous but separated by said filter media in a radial direction and extend axially from an inlet side to an outlet side of the filter media construction preventing direct fluid flow between clean and dirty sides of the filter media construction,
 wherein corrugations of the spacers propagate in a transverse direction of the filter media construction,
 the spacers are continuous in a transverse direction and are approximately less than one tenth of an axial length of the filter media construction in width,
 the spacers are disposed along two axial ends of the flow channels in the transverse direction in a sandwiched gap between two layers of filter media,
 the spacers are adapted to maintain substantially uniform width of the flow channels in a flow direction,
 one of the flow channels is closed to fluid flow at an axial end at the inlet side of the filter media construction thereby forming the clean side and another channel being closed to the fluid flow at an axial end at the outlet side of the filter media construction thereby forming the dirty side, and
 inner and outer ends of both coil-shaped flow channels are closed along an axial direction.

16. The filter media construction as claimed in claim 15, wherein said spacers are selected from the group consisting of corrugated metal foils, dense corrugated papers, and corrugated plastic sheets.

17. The filter media construction as claimed in claim 15, wherein said spacers are disposed in substantially middle portion of the flow channels.

18. An axial flow filter media construction using filter media comprising at least two sets of a plurality of spacers and at least two layers of a filter media combined in an alternating sequence and coiled around a core to form two distinct, continuous, coil-shaped fluid flow channels which are contiguous but separated by filter media in a radial direction and extend axially from an inlet side to an outlet side of the filter media construction preventing direct fluid flow between clean and dirty sides of the filter media construction, wherein the spacers are continuous in a transverse direction and are approximately less than one tenth of the axial length of the filter media construction in width, the spacers are substantially open across the width which is an axial direction of the filter media construction, the spacers are disposed along two axial ends of the flow channels in the transverse direction in a sandwiched gap between two layers of filter media, the spacers are adapted to maintain uniform width of the flow channels in a flow direction, one of the flow channels is closed to fluid flow at an axial end at the inlet side of the filter media construction thereby forming the clean side and another channel is closed to fluid flow at an axial end at the outlet side of the filter media construction thereby forming the dirty side, and inner and outer ends of the flow channels are closed along the axial direction.

19. The filter media construction as claimed in claim 18, wherein said spacers are selected from the group consisting of non-corrugated random-fibre mat made of metal and plastic or open cell foam.

20. The filter media construction as claimed in claim 18, wherein at least one of said spacers is disposed in a substantially middle portion of the flow channels.

* * * * *